March 1, 1932. A. DINA 1,847,643
SUPPORT AND ADJUSTMENT FOR SPEAKING MOVIE PHOTOCELLS
Filed March 31, 1930 4 Sheets-Sheet 1
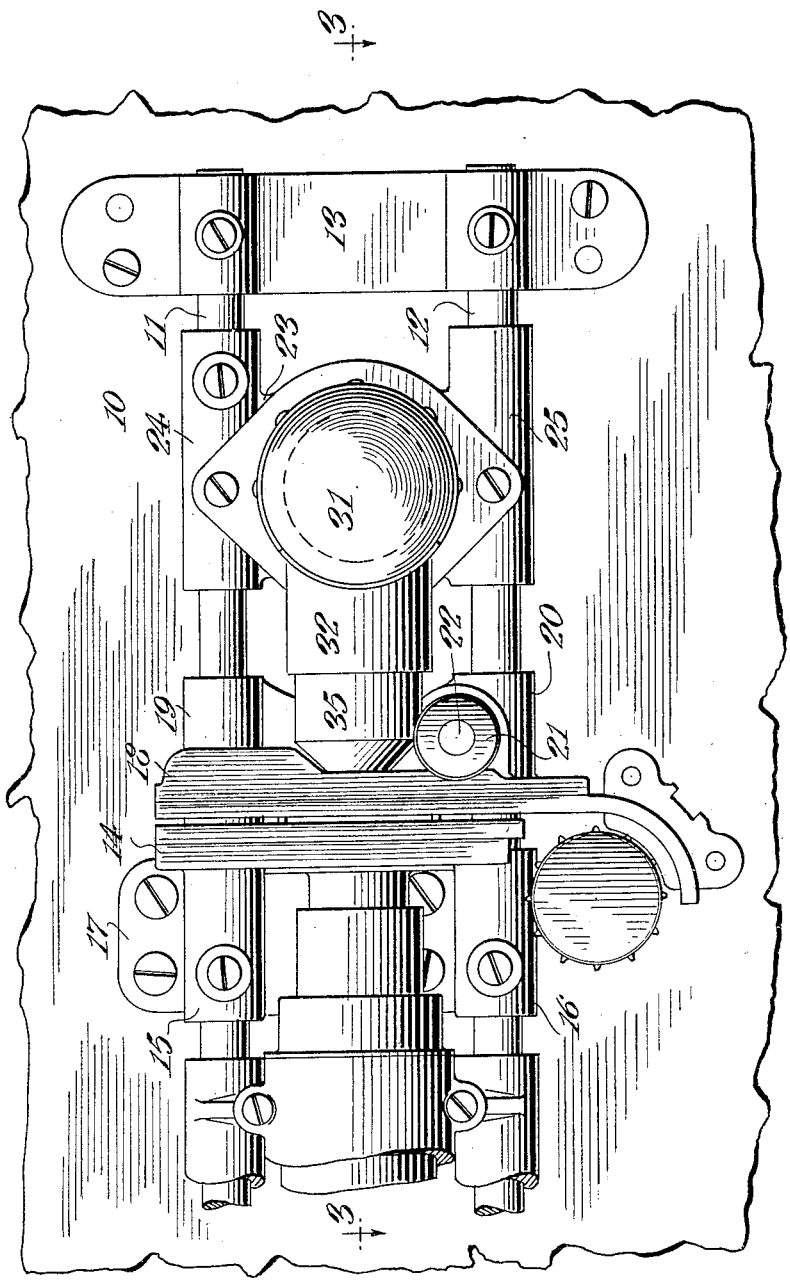
INVENTOR
Augusto Dina
BY
Howard W. Dix
ATTORNEY

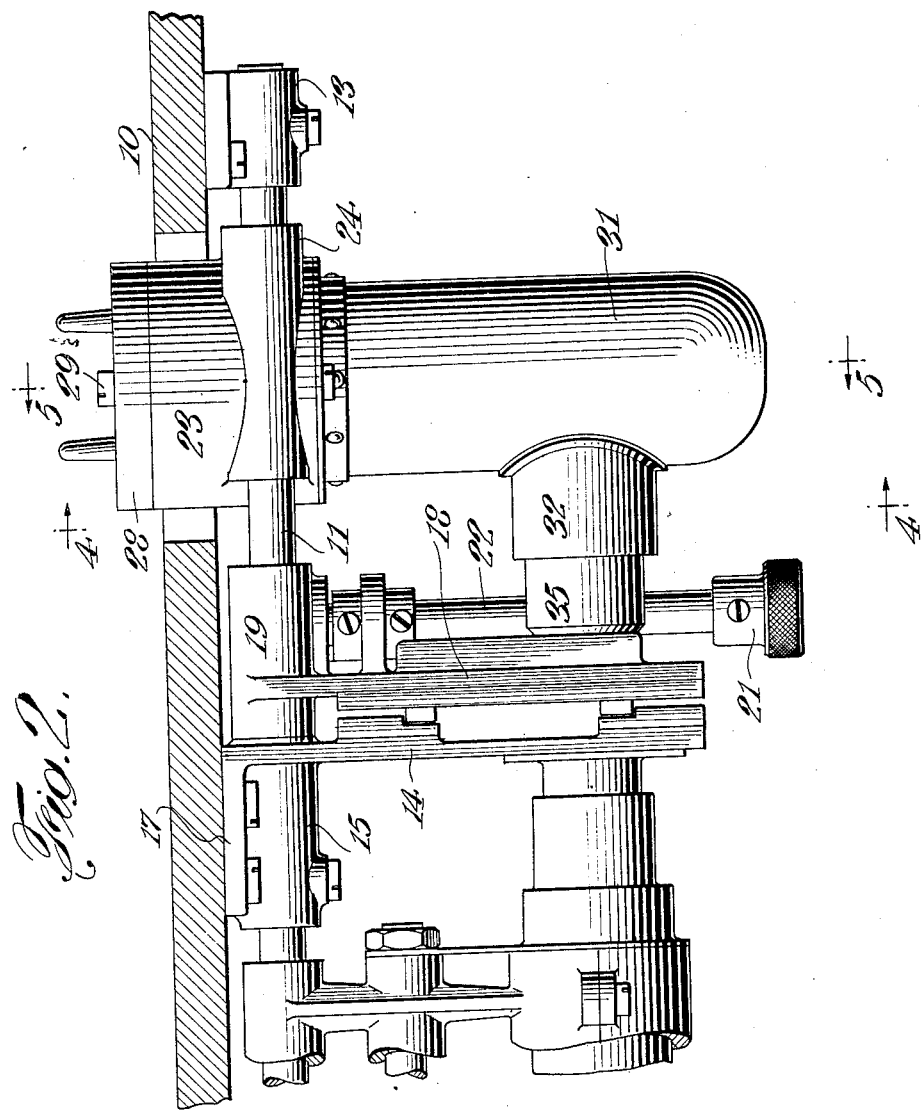

March 1, 1932. A. DINA 1,847,643
SUPPORT AND ADJUSTMENT FOR SPEAKING MOVIE PHOTOCELLS
Filed March 31, 1930 4 Sheets-Sheet 3
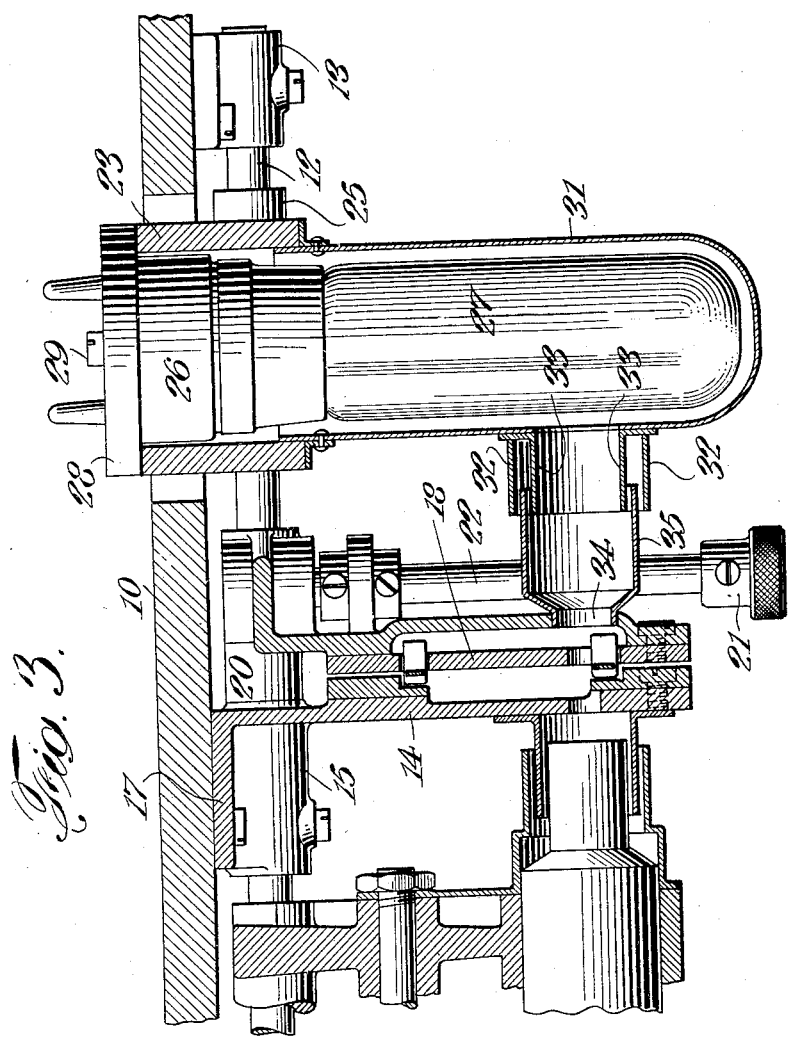
INVENTOR
Augusto Dina
BY
Howard W. Dix
ATTORNEY March 1, 1932.  A. DINA  1,847,643
SUPPORT AND ADJUSTMENT FOR SPEAKING MOVIE PHOTOCELLS
Filed March 31, 1930  4 Sheets-Sheet 4
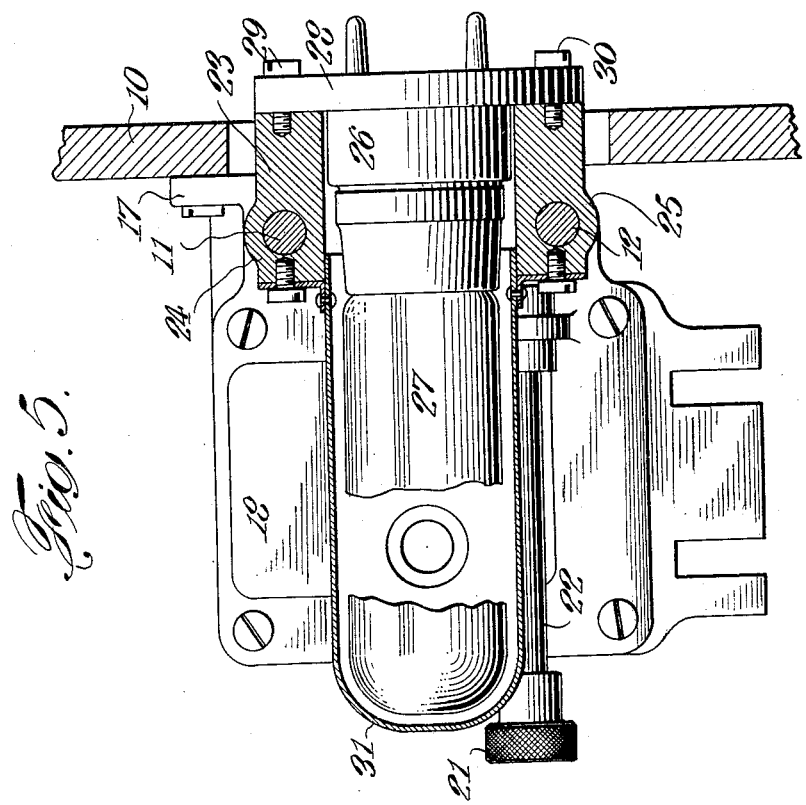
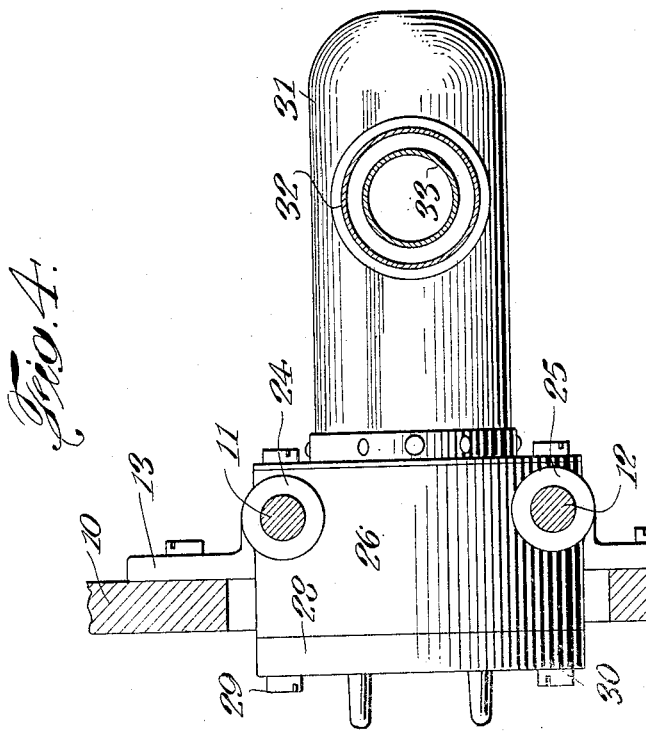
INVENTOR
Augusto Dina
BY
Howard W. Dix
ATTORNEY Patented Mar. 1, 1932

1,847,643

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

SUPPORT AND ADJUSTMENT FOR SPEAKING MOVIE PHOTOCELLS

Application filed March 31, 1930. Serial No. 440,204.

This invention relates to motion picture apparatus and particularly to motion picture projectors which include mechanism for transforming striata on the film into sound as in the speaking-moving picture projectors now in use.

A main object of the invention is to provide a simple, compact, efficient construction whereby the cell or light-sensitive device employed in such mechanism may be mounted on the machine in a manner most efficiently to perform its functions while at the same time being very easily and readily adjustable with respect to the film and the film guiding devices such as the film gate and door.

A further object is to provide a simple and efficient means whereby the light passing through the film is permitted to pass to and fall upon the above mentioned cell with as little loss of light efficiency as possible.

A still further object is to provide simple and efficient means whereby the film door may be moved without in any material manner affecting the transmission of light to the cell and the cell may be adjusted with respect to the door also without loss of the transmission of light.

Further and more specific objects, features, and advantages will more clearly appear from the detailed description given below when taken in connection with the accompanying drawings which form part of the specification and which illustrate one present preferred form of the invention.

In general contemplation of the invention, the cell, the film gate, and the film door are mounted on a support suitably fastened to the usual partition or supporting wall within the projection head and in such a manner that each and every one may be adjusted along the support with respect to each other and the other mechanism on the machine if desired.

Furthermore the invention includes improved means whereby the door and the cell mounting while movable are so related and connected that the light passing through the gate and door to the cell is enclosed within a suitable tube or tunnel and is not lost or strayed even while and if the door and the cell are moved or adjusted with respect to each other as must be the case occasionally.

It will be noted that this invention is primarily concerned with making the cell mounting and the mounting of the gate and door with respect to the cell of such flexibility that the parts may be adjusted and related with the utmost ease and dispatch. Thus the parts are in position to give the most efficient results in their relation and operation.

The present preferred form of the invention is shown in the drawings, in which,

Fig. 1 is a side elevation of the preferred embodiment of the invention;

Fig. 2 is a plan view thereof;

Fig. 3 is a horizontal section in part taken on the line 3—3 of Fig. 1;

Fig. 4 is a vertical section taken on the line 4—4 of Fig. 2; and,

Fig. 5 is a vertical section in part taken on the line 5—5 of Fig. 2.

As shown in the drawings, the invention is applied to a motion picture apparatus in the form of the projector having a central mechanism-supporting wall or partition such as 10. Disposed along the wall 10 are spaced preferably horizontally disposed rods 11 and 12 suitably supported at their ends in brackets such as 13 shown in Fig. 1.

Midway of these rods 11 and 12 is disposed a film trap gate member 14 which is provided with collars 15 and 16 for embracing the rods 11 and 12 and is also preferably fastened to the partition 10 by means of the bracket 17. Adjacent this gate 14 which is generally fixed in position, there is disposed a movable door element 18. This element is provided with collars 19 and 20 which embrace the rods 11 and 12 and is adapted to be slid therealong. To move the door 18 it is merely necessary to turn the knob 21 on shaft 22 the other end of which has a gear meshing with a rack on rod 11 altho this detail of construction is not shown. The normal position of the door 18 is against the gate 14 as shown in Fig. 1. When the knob 21 is operated, the door 18 may be moved away from the gate 14 and the film removed or threaded or otherwise handled.

Between the door 18 and the bracket 13 there is slidable on the rods 11 and 12 a frame member 23 having collars 24 and 25 embracing the rods 11 and 12. The frame member 23 has a large opening therein in which is seated or housed a socket 26 for a cell 27 such as a selenium cell used in speaking-movies. The socket has a base plate 28 which is fastened to the frame 23 by means of screws such as 29 and 30.

The cell 27 is protected and covered by a casing such as 31 fastened to one face of the frame 23. At the side of the casing 31 there is an aperture around which, on the outside of the casing 31, there is disposed a double walled tubular element having annular walls such as 32 and 33. This element extends from the casing in the direction of the gate 14 and the door 18, and in alinement with an aperture 34 in the door through which the light from the projection beam passes after it has passed through the film which passes between the gate and the door. Fastened to the door and disposed thereon around the aperture 34 is a tube 35 which extends from the door in the direction of the cell 27. As shown in Fig. 3 the outer end of the tube 35 projects to some extent into and between the walls 32 and 33 above mentioned even when the door is farthest away from the cell 27. Thus there is provided a constantly closed path for the light passing from the door to the cell 27 so that the efficiency of light transmission is not diminished and a portion of the light lost as stray light. The action of the tubular walls 32 and 33 and the tube 35 is telescopic in character altho they do not necessarily touch. Because of this there is no undue friction. It may be noted that other forms of apparatus may be employed to protect these light rays.

It will also be noted that the aperture 34 is disposed at the side of the door 18 and thus will be in line with the side of the film where the sound striata are usually located. In order to get the lamp or cell 27 into exact position with respect to the light beam and its focal point or other optical relation, the cell mounting is adjustable as above described. It is of course desirable to have the cell 27 as near the door 18 as possible but at the same time it is necessary to move the door away from the gate 14 to permit adjustment and repair of and threading of the film so that the cell 27 has to be a certain distance away from the door. Regardless of whether the door is close to or away from the cell mounting the light is properly transmitted thereto because of the telescopic tubular connection between the cell housing and the door aperture.

The adjustable mounting of the gate, the door, and the cell housing is very simple and easy to manipulate, and yet the adjustment permits of an exactness which allows very fine adjustments for precision.

Thus there is provided a film trap gate and door as a unitary part of the system including a lamp or cell enclosed in a protective casing and associated with the trap through the intermediary of a telescopic tubular passage which remains closed no matter what is the position of the cell with respect to the door and the gate. The elements are preferably mounted on a suitable support on which they are readily adjustable and slidable and the support preferably consists of a pair of simple spaced rods with which the elements each engage in a slidable manner. Thus the elements can be easily adjusted with respect to the support and each other with a minimum of effort. When the door is moved in its usual operation to or away from the gate the light passing through the door to the lamp or cell is nevertheless completely protected.

While the invention has been described in detail and with respect to a present preferred form thereof, it is not to be limited to such details and forms since many changes and modifications may be made in the invention and the invention embodied in other forms and modifications without departing from the spirit and scope of the invention in its broadest aspects. Hence it is desired to cover any and all forms and modifications which may come within the language or scope of any one or more of the appended claims.

What is claimed, is,

1. In a motion picture apparatus, a film trap gate and door, a pair of rods, a partition on which said rods are horizontally spaced to act as supports, said gate and door slidable along said rods, means on the door to be moved and engaging the rods to move the door along the rods, a photo cell slidably disposed on the rods, a tubular member extending from the cell, an enclosing casing around the cell to which the tubular member is attached, a similar tubular member on the door on the face adjacent the cell, said last mentioned tubular member having always, and independent of the position relatively between the cell and the door, a telescopic relation with the tubular member on the cell to prevent the straying of the light passing from the door to the cell.

2. In a talking motion picture apparatus, a mechanism supporting partition, a sound film trap gate and door, supporting means on the partition on which said trap elements are slidably mounted, a photo cell also slidably connected on said supporting means and means for moving said door at will with respect to said cell and said gate.

3. In a talking moving picture apparatus, a mechanism supporting partition, spaced supporting rods on said partition, a sound film trap door and gate, and a photo cell slidably mounted on said rods, means for temporarily fixing the position of the gate and the cell on said rods and means for moving the door relatively with respect to the cell and the gate.

4. In a talking motion picture apparatus, a mechanism supporting partition, a plurality of supporting elements mounted thereon, a photo-electric cell adjustably mounted on said elements and having an enclosing casing, a sound film trap door slidably mounted on said elements, and telescopically related means on the door and the casing cooperating to enclose light passing between the door and the cell, and means for moving the door along said elements with respect to the cell.

5. In a talking motion picture apparatus, a mechanism supporting partition, a pair of spaced supporting elements mounted thereon in a line parallel to the sound optical axis, a sound film trap gate and door adjustably mounted on said elements, a photo cell also adjustably mounted on said elements, means for clamping the gate and the cell in desired relations, means for moving the door along said elements with respect to the gate and cell and cooperating means associated with the cell and the door to enclose light passing therebetween regardless of the position of the door with respect to the cell and the gate.

AUGUSTO DINA.